US012664911B2

(12) United States Patent
Zholobov et al.

(10) Patent No.: US 12,664,911 B2
(45) Date of Patent: Jun. 23, 2026

(54) SYSTEM AND METHOD FOR CREATING A TRAINING SCRIPT ON A VIRTUAL LABORATORY

(71) Applicants:Constructor Technology AG, Schaffhausen (CH); Constructor Education and Research Genossenschaft, Schaffhausen (CH)

(72) Inventors: Denis Zholobov, Belgrade (RS); Laurent Dedenis, Singapore (SG); Serg Bell, Costa del Sol (SG); Stanislav Protasov, Singapore (SG)

(73) Assignees: Constructor Technology AG, Schaffhausen (CH); Constructor Education and Research Genossenschaft, Schaffhausen (CH)

( * ) Notice: Subject to any disclaimer, the term of this patent is extended or adjusted under 35 U.S.C. 154(b) by 37 days.

(21) Appl. No.: 18/360,107

(22) Filed: Jul. 27, 2023

(65) Prior Publication Data

US 2025/0037607 A1     Jan. 30, 2025

(51) Int. Cl.
*G09B 19/00* (2006.01)
*G09B 9/00* (2006.01)
*G06F 9/455* (2018.01)
*G06N 20/00* (2019.01)
*G06Q 50/20* (2012.01)

(52) U.S. Cl.
CPC ........... *G09B 19/0053* (2013.01); *G09B 9/00* (2013.01); *G06F 2009/45562* (2013.01); *G06N 20/00* (2019.01); *G06Q 50/20* (2013.01)

(58) Field of Classification Search
CPC ...... G09B 19/0053; G09B 9/00; G06N 20/00; G06Q 50/20; G06F 2009/45562
See application file for complete search history.

(56) References Cited

U.S. PATENT DOCUMENTS

| | | | |
|---|---|---|---|
| 9,947,236 B2 | 4/2018 | Romney et al. | |
| 10,757,132 B1 | 8/2020 | Powers et al. | |
| 2004/0122784 A1* | 6/2004 | Lewis | G06N 20/00 706/12 |
| 2011/0269111 A1* | 11/2011 | Elesseily | G09B 23/28 434/362 |

(Continued)

FOREIGN PATENT DOCUMENTS

| | | |
|---|---|---|
| CN | 112182900 A | 1/2021 |
| IN | 202121020394 A | 6/2021 |

*Primary Examiner* — Jack Yip
(74) *Attorney, Agent, or Firm* — ESPE Legal Consultancy FZ-LLC

(57) ABSTRACT

Systems and methods for creating a training script on a virtual laboratory instance running in an e-learning infrastructure. The method comprises deploying a virtual laboratory instance from a template on e-learning infrastructure. The virtual laboratory instance includes preconfigured training software and an action interception tool. The method further comprises intercepting system events at the action interception tool corresponding to training software operation, pre-processing intercepted events by filtering and grouping events into an action-centric dataset, generating a training script using a machine learning model, based on an action-centric dataset, in a human-readable format, and storing the training script in a structured text-based format file.

20 Claims, 7 Drawing Sheets

(56) References Cited

U.S. PATENT DOCUMENTS

| | | | |
|---|---|---|---|
| 2014/0017653 A1* | 1/2014 | Romney | G09B 5/00 |
| | | | 434/350 |
| 2015/0310751 A1 | 10/2015 | Tolia | |
| 2017/0025040 A1* | 1/2017 | Maturana | G06N 5/04 |
| 2019/0180637 A1* | 6/2019 | Mealer | G16H 50/50 |
| 2020/0160745 A1 | 5/2020 | Jain et al. | |
| 2022/0238037 A1* | 7/2022 | Donovan | G09B 7/04 |
| 2024/0321130 A1* | 9/2024 | Shah | H04L 67/10 |

\* cited by examiner

Method 700

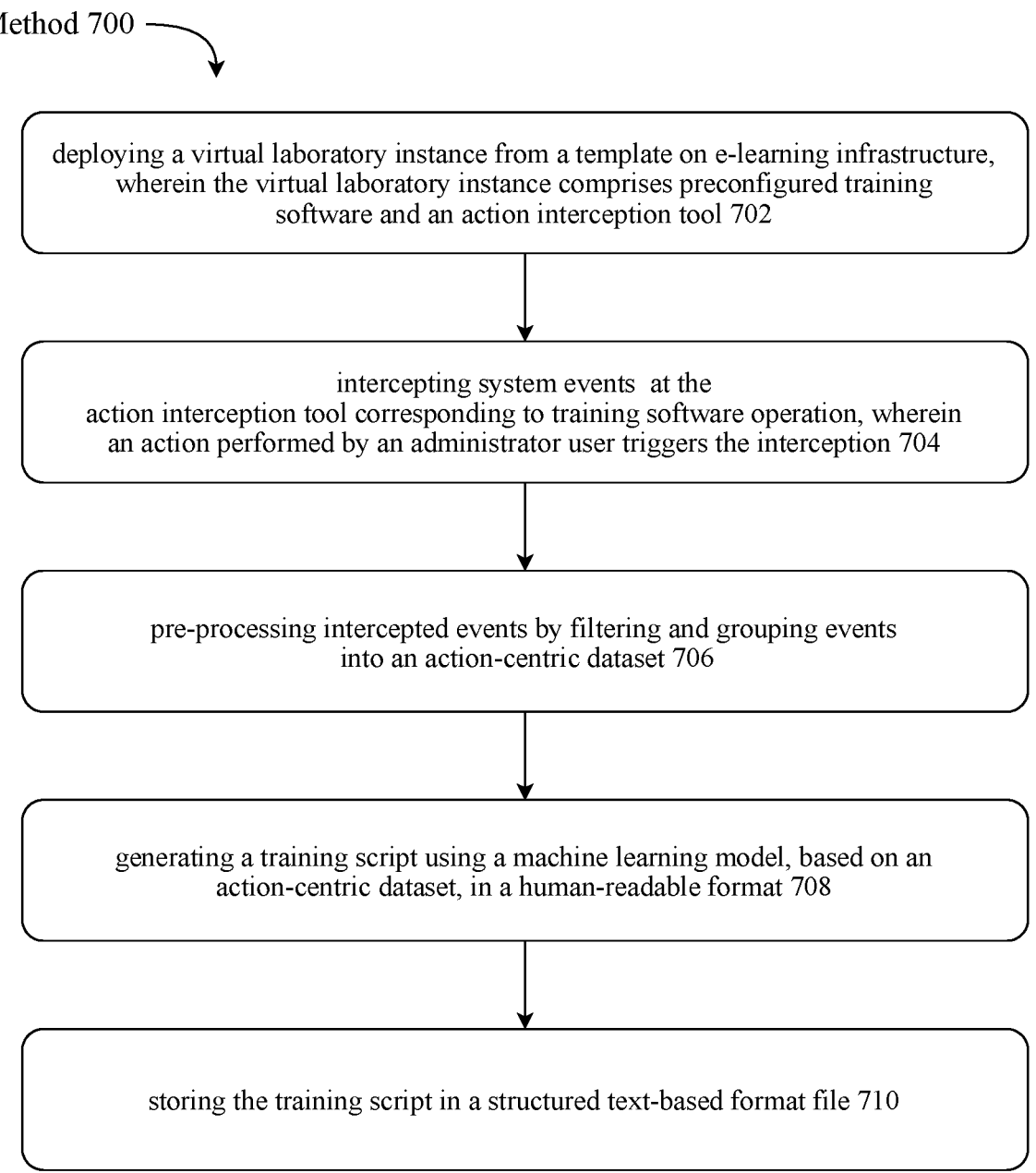

deploying a virtual laboratory instance from a template on e-learning infrastructure, wherein the virtual laboratory instance comprises preconfigured training software and an action interception tool 702 intercepting system events at the action interception tool corresponding to training software operation, wherein an action performed by an administrator user triggers the interception 704 pre-processing intercepted events by filtering and grouping events into an action-centric dataset 706 generating a training script using a machine learning model, based on an action-centric dataset, in a human-readable format 708 storing the training script in a structured text-based format file 710

Fig. 7

SYSTEM AND METHOD FOR CREATING A TRAINING SCRIPT ON A VIRTUAL LABORATORY

TECHNICAL FIELD

The present disclosure generally relates to a virtual laboratory deployed in a virtual environment. In particular, the present disclosure relates to creating a training script in a virtual laboratory.

BACKGROUND

Virtual laboratories, referred as to labs, are interactive digital simulations of environment for educational, testing and researching purposes. Virtual labs include virtual networks, virtual machines, automation scripts, tools, equipment, tests, and procedures that are typically used in a real environment. As one of the most important e-learning tools, the virtual labs allow the student to conduct various experiments without any constraints to place or time, in contrast to the constraints of the production environment.

For someone to perform a practical task, such as simulating an Integrated Circuit (IC), or a testing task, such as software testing, step by step instruction to execute the practical task or the testing task is required. The instructions guide a user about how to manage a graphical interface, executing computer code, running scripts, executable files, queries to databases or data stores, configure the operating environment and the solution being studied, as well as instructions for checking the results of work after passing all script steps.

In order to create human-readable instructions, it is necessary to describe each step related to different projects, such as a name of managed objects, program code, control parameters, editable data fragments, form field names, and the expected result of actions. Manual creation of the instruction can be a time-consuming task, based on the number of projects associated with the virtual lab. Therefore, automation of instruction generation is highly desired. The task of instruction generation is simplified with current semi-automatic technology, where the user can use several activity trackers configured to track various activities being performed on the screen, such as the changes on the screen, the position of the cursor, and input from the keyboard or computer mouse. However, the technology of semi-automatic generation of instructions faces an additional problem that in this form it is practically impossible to reproduce a given instruction automatically as a script execution. Further, due to the versatility of the preparation involved in executing the various tasks on the virtual laboratory and lab solutions, it is increasingly more challenging with different software products with different system requirements and architectures to be tested in a single environment and prepared instructions accordingly in the single environment.

Therefore, there is a need for a solution for creating a training script which contains human readable instruction for performing various tasks in the virtual lab in a single environment. It is needed that the instructions are generated automatically. It is also important that the training script is adequately descriptive and structured so that it makes it easy to run a new lab from the initial system state, and capable of tracking and replaying each step.

SUMMARY

The present disclosure relates to a system and method for creating a training script on a virtual laboratory instance including installed training software and running in an e-learning infrastructure.

In an embodiment, a method for creating a training script on a virtual laboratory instance including installed training software and running in an e-learning infrastructure comprises deploying a virtual laboratory instance from a template on the e-learning infrastructure, wherein the virtual laboratory instance comprises preconfigured training software and an action interception tool; intercepting system events using the action interception tool corresponding to training software operation: pre-processing the intercepted system events by filtering and grouping events into an action-centric dataset: generating a training script using a machine learning model, based on the action-centric dataset, in a human-readable format; and storing the training script in a structured text-based format file.

In one aspect, the e-learning infrastructure is operated by a user on a user computing device through a web browser or a virtual lab console.

In one aspect, a method further comprises editing the training script by a script editor.

In one aspect, the template comprises at least one of a Virtual machine snapshot, a container file, and a configuration file.

In one aspect, the e-learning infrastructure is deployed in a form of at least one of: an installed application on a user computing device: a web server connected to the user computing device through a network; a virtual network in a virtual environment, wherein one or more virtual machines are connected in the virtual network; and a plurality of containers running on a server.

In one aspect, the training script is saved as a snapshot of the virtual laboratory instance and recorded in a sequence of system event occurrences, and wherein the training script is replayable according to the sequence of system event occurrences.

In one aspect, a method further comprises evaluating a state of the virtual laboratory instance to ensure successful execution of the installed training software.

In one aspect, the installed training software is multi-componential and implemented on a plurality of virtual laboratory instances.

In an embodiment, a system to create a training script on a virtual laboratory instance including installed training software and running in an e-learning infrastructure comprises a virtual lab instance, deployed from a lab template on the e-learning infrastructure, comprises a preconfigured training software and an action interception tool, wherein the action interception tool is configured to intercept system events corresponding to training software operation; a pre-processing module configured to pre-process the intercepted system events by filtering and grouping events into an action-centric dataset; a test script generator configured to generate a training script based on the action-centric dataset, in a human readable format; and a script storage configured to store the training script in a structured text-based format file.

In an embodiment, a system for generating a training script comprises a virtual lab instance instantiated according to a lab template corresponding to a state of training software, the virtual lab instance providing a virtual simulation environment for the training software; an action interception tool configured to intercept system events corresponding to operation of the training software: a pre-processing module configured to group the intercepted system events according based on a dataset of valuable events to create a group of intercepted system events; and a test script generator configured to generate a training script based on the group of intercepted system events.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 7 is a flowchart of a method for creating a training script on a virtual laboratory instance with installed training software and running in an e-learning infrastructure, in accordance with an embodiment.

Figure 1:
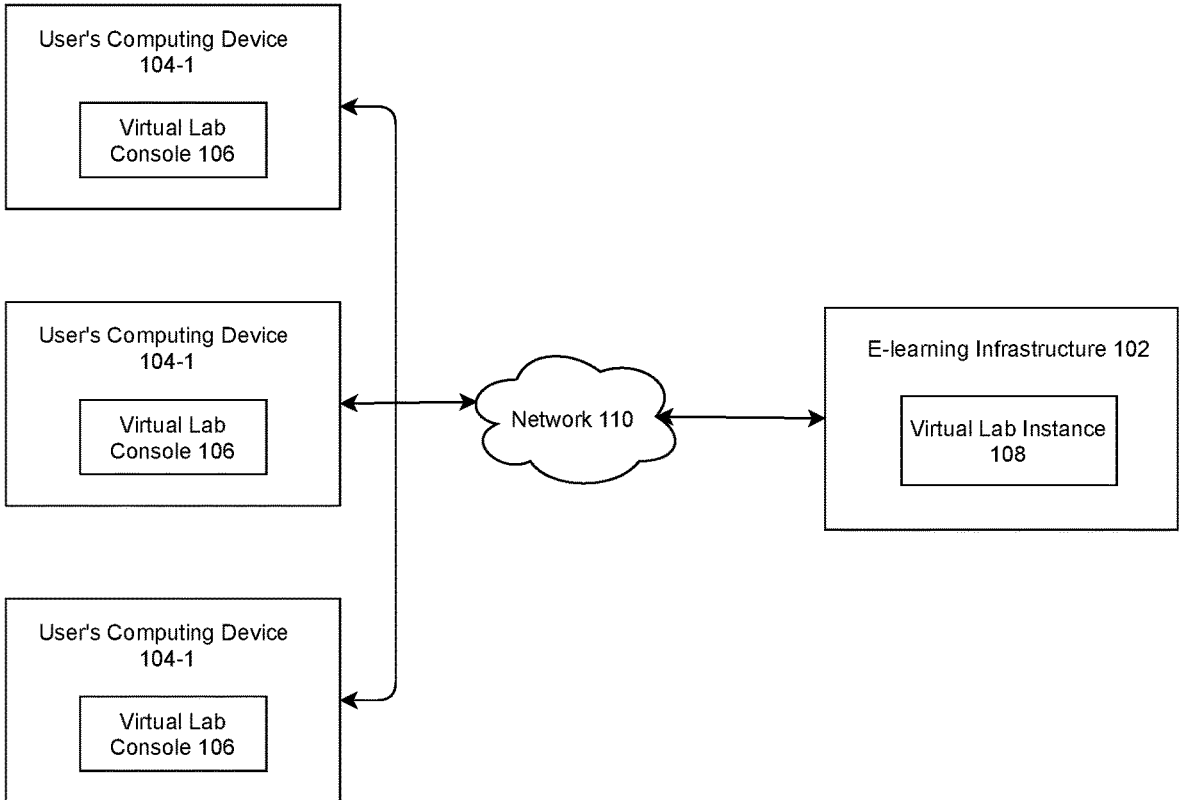
FIG. 1 is a block diagram of a system environment, in accordance with an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

The present disclosure relates to a virtual laboratory deployed in a virtual environment. In particular, the present disclosure relates to a system and method for creating a training script in a human readable format in a virtual laboratory.

FIG. 1 is a block diagram of a system environment, in accordance with an embodiment. The system generally comprises an e-learning infrastructure 102 and one or more user computing devices 104 operable coupled through a network 110.

The system is configured to create a training script on a virtual laboratory instance 108, interchangeably referred to herein as a virtual lab, with installed training software 212 (referring also to FIG. 2) and running in an e-learning infrastructure 102. In one aspect, the system is implemented on the e-learning infrastructure 102 for student users. The e-learning infrastructure 102 provides a complete environment where students can learn by attending online lectures, performing practical tasks, completing assignments, appearing for the examinations, and getting assessed by the lecturers. To cater to such e-learning requirements, the e-learning infrastructure 102 mainly includes, but is not limited to, Learning Management System (LMS), electronic devices, communication applications, and internet accessibility. In an embodiment, the e-learning infrastructure 102 is provisioned with the virtual lab instance 108, where the students can perform the practical tasks related to different courses and test the software programs by simulating the practical tasks or execution of the software program.

In one embodiment, the e-learning infrastructure 102 is operated by a user through a user computing device 104 as a web browser and a virtual lab console 106. Examples of the user computing device 104 include desktop computers, laptop computers, personal digital assistants (PDAs), smartphones, tablets, and the like. In one instance, on a student's computing device 104, the system is implemented by the e-learning infrastructure 102 with various types of virtual lab instances, for example, a virtualized application, a virtual container, a virtual machine, or a virtual network of multiple virtual machines or containers. One or more virtual machines are connected in the virtual network 110 intercepted by an action interception tool 206. In yet another embodiment, the e-learning infrastructure 102 is implemented as a data container. The data container stores a system state for which the exact system can be recreated. Thus, by using the system state stored in the data container, the e-learning infrastructure 102 can be recreated on the user computing device 104.

Figure 2:
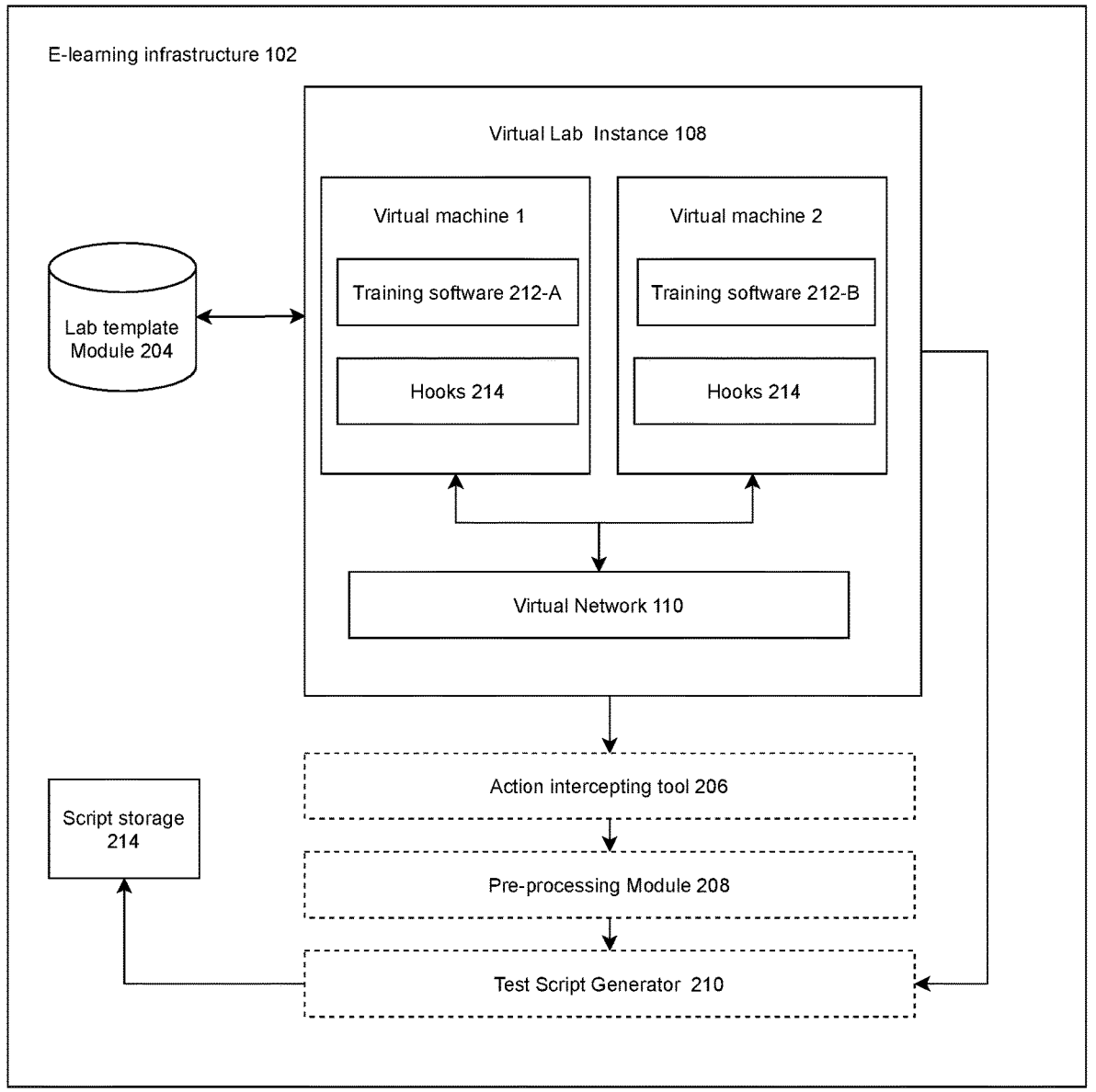
FIG. 2 is a block diagram of system components, in accordance with an embodiment.

Referring also to FIG. 2, a block diagram of system components is depicted, according to an embodiment. The e-learning infrastructure 102 generally includes, but is not limited to, a virtual lab instance 108 having one or more virtual machines running in a virtual network 110 and a lab template module 204.

According to an embodiment, the virtual lab instance 108 is a virtual laboratory that provides a simulation environment that allows users to conduct practical tasks or testing tasks related to software testing in virtual environments. A user runs the software components 212 to be tested on the virtual lab having simulated execution of the software. According to the embodiment, the virtual lab instance 108 is connected to a plurality of virtual machines through a virtual network 110. In one embodiment, a user can access the virtual lab by running a virtual machine on his computing device 104. Each virtual machine is capable of running programs and deploying applications required to run the virtual lab instance 108 on the user computing device 104.

In accordance with an embodiment, the virtual lab is coupled to the lab template module 204. The lab template module 204 is configured to store and to edit the virtual lab instance 108 which corresponds to a particular state of the training software 212 in a form of lab template. The lab template module 204 is a set of programmable and computer readable instructions that is run in the e-learning infrastructure. The lab template module 204 is at least one of a set of media files, configuration files, virtual machine snapshot, and virtual disk. In other words, the virtual lab is deployed from the lab template module 204 on the e-learning infrastructure 102.

In an embodiment, the system is particularly configured for creating training scripts in a virtual laboratory instance with installed training software 212 and running in an e-learning infrastructure 102. The system includes, but is not limited to, a virtual lab instance 108 and a lab template module 204. Optionally, in embodiments, as will be described, the system further comprises a pre-processing module 208, a test script generator 210, and a script storage 214.

As described earlier, the virtual lab instance 108 provides a virtual simulation environment for a preconfigured training software 212 and an action interception tool 206 corresponding to the preconfigured training software 212. The training software 212 is a software or a software component which is being tested on the virtual lab instance 108. The training software 212 is also referred to herein as software components interchangeably. The software components are enumerated as 212, individually and collectively. The virtual lab instance 108 comprises one or more virtual machines connected in the virtual network 110, and the action interception tool 206, such as the hook 214. Each virtual machine is utilized to create a virtual lab to address at least one software component. For example, Virtual machine A is configured to test software component A.

In one embodiment, the virtual lab instance 108 is deployed from the lab template module 204 corresponding to the preconfigured training software 212. In one embodiment, the training software 212 is multi-componential comprising at least one Database (DB) node, a management agent, and a backup engine, capable of implementing on a plurality of virtual laboratory instances. The DB nodes are storage nodes that connect to databases and perform different operations on the databases, such as update, insert, delete, and select. Each type of database requires different configuration information. DB nodes store different operations corresponding to different projects. In one embodiment, the operational tasks of the virtual lab instance 108 are managed by a management agent. The management agent is a software agent that runs on a managed node and provides an interface to manage the node. The management agent can perform operations on managed objects in the node. In one embodiment, a backup copy of the virtual lab instance 108 can be generated by the backup engine. The backup engine is capable of generating a backup copy such that by utilizing the backup copy a plurality of virtual lab instance 108 can be implemented.

The lab template module 204, in one embodiment, comprises one or more templates required to set one or more labs. For example, the virtual lab instance 108 can deploy one or more labs for testing multiple components, having each component being tested on a different virtual machine, simultaneously. Therefore, each virtual machine will be required to run a lab template corresponding to a specific software component. The virtual lab is then initiated to cater to the specific training software 212 by deploying the lab template corresponding to the specific training software 212.

In one embodiment, the virtual lab has a plurality of virtual data center components, each of which can correspond to multiple virtual machines. A display screen of the user computing device 104 displays any initiated virtual machine of the virtual lab instance 108. The user, for example, a student, can then interact with the virtual machine through his personal computing device the same way that the user interacts with a local physical machine.

In one embodiment, the virtual lab instance 108 is configured to deploy a test environment through the virtual machines. The test environment is configured using the corresponding lab template that can include one or more pre-built library functions required for testing the software components 212.

According to one embodiment, the template comprises at least one of a Virtual machine snapshot, container file, and configuration file.

In accordance with the embodiment, the virtual lab instance 108 is configured to generate a snapshot of one or more running virtual machines deployed on the e-learning infrastructure 102. For example, the user may select one virtual machine or a plurality of virtual machines running a collaborative project connected in the virtual network 110 to generate a snapshot. When a snapshot is generated, the complete state for each of the virtual machines is stored in the lab template module 204 of the system. The snapshot, in one embodiment, can be stored as a lab template for the corresponding project. The snapshot can be utilized to set the virtual lab thereafter for any number of times. For example, during the testing of the software component, the user may find an error in the software component being executed in an environment setup in accordance with the snapshot. The user may recreate the same environment setup while correcting the code or redeveloping the code of that software component.

In accordance with the embodiment, the virtual lab instance 108 is configured to generate a data container storing system data corresponding to one or more virtual machines deployed on the e-learning infrastructure 102. The data container stores the system data which is required to recreate the system state of the virtual machine at a particular instance. In the embodiment, the system state, corresponding to one or more virtual machines deployed in the e-learning environment, is captured as a configuration file. Upon execution of the configuration file, the system state at one particular instance can be recreated. Similar to the snapshot, the data container and the configuration file are stored in the lab template module 204 as a lab template.

In one embodiment, the virtual lab instance 108 is configured to deploy a practical task performing environment through the virtual machines. The practical task performing environment is configured to allow a user to run various practical tasks within the e-learning infrastructure 102. For example, one student creates a software testing project and runs the experimental steps to conclude the practical task. In another example, one or more students can combine to create a single project, and work together by sharing the data in collaboration through the Internet. The project is created by allocating the required resources of the physical machine on which the virtual machine is running.

Once the virtual lab is created, the action interception tools 206 initiate an event intercepting process, in accordance with an embodiment. Events can include actions and occurrences of activities taking place in a computer system that are detectable by a monitoring process. Examples of the events include launching or closing of a program or data file, clicking a mouse button by a user, typing using a keyboard by a user, creation and storage of a file, memory violation, and the like. Interception is a process of detecting an occurrence of a start of an event, such as the creation of a file, mouse button clicks, launching of a process, and the like, and holding up the completion of that event until a specific action relating to that event is initiated or completed.

In one embodiment of intercepting the events, a hypervisor Application Programming Interface (API) drives the interception of execution of the event which occurs after some action taken by a user through a virtual machine in order to execute testing of the software component A. For example, the hypervisor API may register a hook 214 on the return from a system call to which execution of the event was directed. Thus, the hypervisor API can intercept the execution of the event from the system call based on hooking.

In accordance with an embodiment, the system further comprises a pre-processing module 208 configured to pre-process the intercepted events by filtering and grouping events into an action-centric dataset. The action-centric dataset is a set of actions which cause occurrences of certain events. For instance, not all the data and events are valuable.

In embodiments, certain valuable events can include events in a certain list of events, and/or a sequence of events that may be useful for the script generation. To identify the occurrence of such events, the pre-processing module 208 is configured with a set of rules to perform filtering of the events and grouping of the events. In one embodiment, the event interception is triggered by a user's actions. For example, all the events of clicking the mouse buttons may not be valuable, but the clicking of the mouse resulting in execution of a tab 'Run' which runs the software component in a compiler may be valuable. Such events are filtered from the rest of the events and grouped into the action-centric dataset. In another embodiment, events are filtered based on the interaction with UI or the environment they cause. For example, only those events that cause such interaction or lead to the changes in the UI or environment are processed. For example, mouse clicking on non-interactive UI components is not processed, while mouse clicking on any inter-active element like button or selector is processed.

According to yet another embodiment, the system further comprises the test script generator 210 configured to gen-erate a training script based on the action-centric dataset. The actions which caused the occurrence of certain events are identified as training steps. In one embodiment, script generator is based on a neural network machine learning model, which is trained on labeled data: parts of an action-centric dataset is marked or linked or labeled with corre-sponding text that represent test script steps. In one embodi-ment, the script is generated in a human readable format. Multiple mechanisms can be utilized to generate the steps from the action-centric dataset in the human readable for-mat. In one example, the system reads the title field of the window or element that received the focus or mouse/keyboard event. This can be done in the browser 302 and can be done on Windows via xperf. Similar mechanisms are available with MacOS and Linux.

The training steps present the actions and events that occur during the course of execution of the practical task or testing the software component, enlisted in a sequence, so that the user, such as a student, knows exactly which steps to be followed and in which sequence to perform the practical task or the testing task. In a nutshell, the training script is a workflow which includes a stepwise algorithm describing the flow of execution of a particular task or testing task.

In one embodiment, the training script is stored as a snapshot of the virtual laboratory instance and recorded in a sequence of system event occurrences. For example, the occurrence of certain events is identified and actions that resulted into the occurrence of the certain events are recorded in the identical sequence. The system state of one or more virtual machines is recorded as the snapshot includ-ing the sequential training steps to perform the certain events. The snapshot of the training script is captured from a single virtual machine. In another embodiment, the snap-shot is captured from a plurality of virtual machines running the collaborative project. Utilizing the snapshot, the user may follow the exact steps mentioned therein to perform the certain practical tasks or testing tasks.

In one embodiment, the training script is capable of replaying according to the sequence of the system occur-rence. For example, the operations or actions captured in the training script can be re-implemented on the system by execution of the training script.

In one embodiment, the test script generator 210 com-prises the script editor 306 configured to edit the training script. The training script, generated automatically, can be edited, such as adding more descriptive comments, explana-tory text, or any such addition or deletion that may render additional clarity to the training script from the user's perspective. With the script editor, the script can be edited as follows: adding step, deleting step, splitting step, grouping several steps, editing step description, insert images into steps description, changing the order of the steps.

In accordance with one embodiment, the system further comprises a script storage 214 configured to store the training script in a structured text-based format file. In one example, the script storage 214 is a cloud-based data stor-age. In another example, the script storage 214 is a memory device coupled to the system. The training script is stored so that the user can fetch the script before initiating the prac-tical or testing task, and follow the steps as mentioned.

Figure 3:
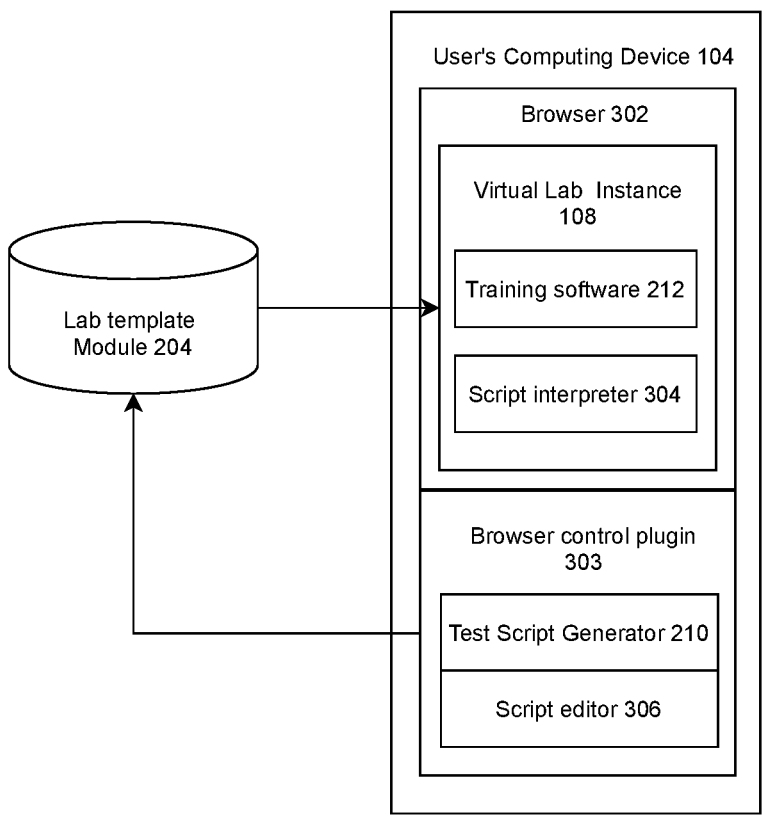
FIG. 3 is a block diagram of a system implemented on the user computing device through a web browser and a browser control plugin, in accordance with an embodiment.

FIGS. 3-6 depict different embodiments of systems. Cer-tain embodiments include elements already discussed above, which are not re-discussed for ease of explanation. FIG. 3 is a block diagram of a system operated on the user computing device 104 through a web browser 302 and a browser control plugin 303, in accordance with an embodiment. In an embodiment, the user computing device 104 is connected to the network 110 through which the user can access the browser 302 to run the virtual lab instance 108. The virtual lab instance 108 comprises the training software 212 and a script interpreter 304. The interpreter is a computer program that directly executes the script steps/instructions written in a programming or scripting language, without requiring them previously to have been compiled into a machine language program. On the user's computing device, the browser control plugin 303 is implemented, according to one embodiment. The browser control plugin 303 includes the test script generator 210 and the script editor 306 for the training script generation. In one embodiment, the generated training script is stored at the lab template module 204 as a lab template so that a user can follow the script steps/instructions to implement the corresponding project.

Figure 4:
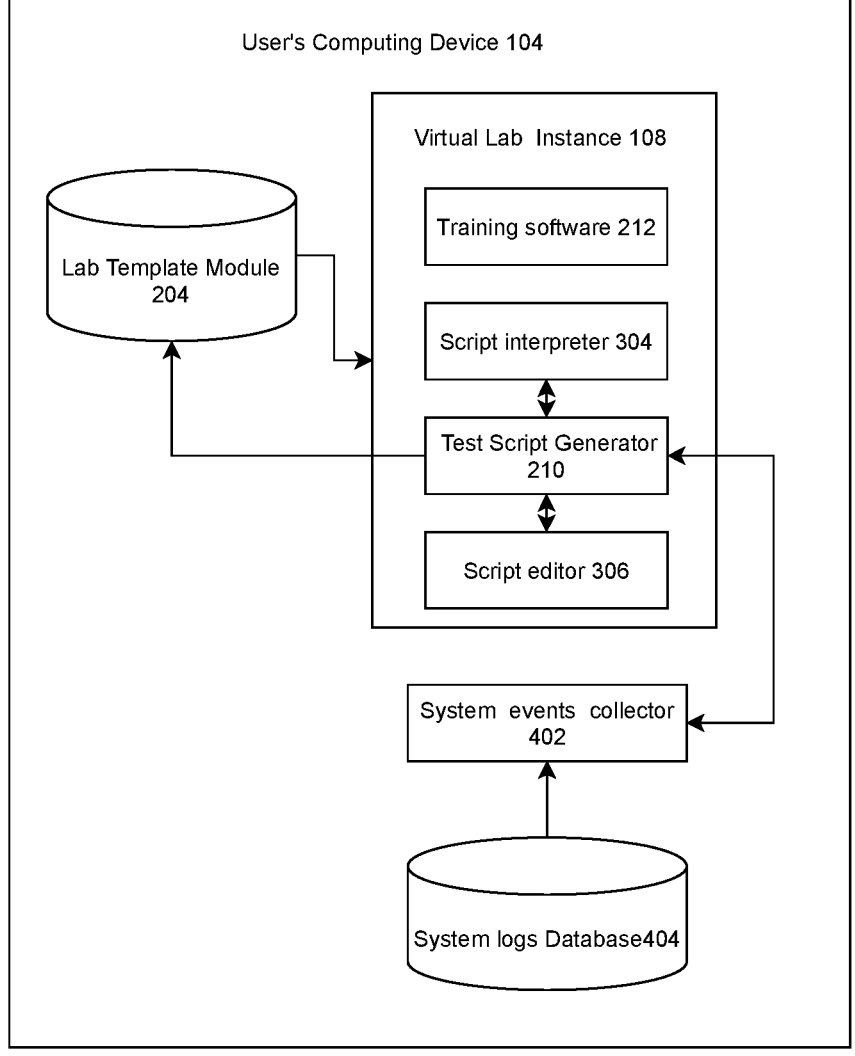
FIG. 4 is a block diagram of a system implemented on the user computing device as an installed application, in accordance with an embodiment.

FIG. 4 is a block diagram of a system implemented on the user computing device 104 as the installed application, in accordance with an embodiment. The installed application is configured to implement the virtual lab instance 108 on the user computing device 104. In this embodiment, the virtual lab instance 108 includes, but is not limited to, the training software 212, the scripting interpreter 304, the test script generator 210, and the script editor 306. The training script can be stored as a lab template. Unlike the embodiments described with reference to FIG. 2, in the present embodi-ment, the separate software plugin is not necessary. The test script generator 210 and the script editor 306 are included in the application itself. The application is provided with access to the system logs of the user computing device 104. A system events collector 402 module is configured to collect the system logs from the system log database 404 of the user computing device 104. The test script generator 210, in one embodiment, fetches the system log from the system events collector 402 module to generate the training script based on the system events of the user computing device 104.

Figure 5:
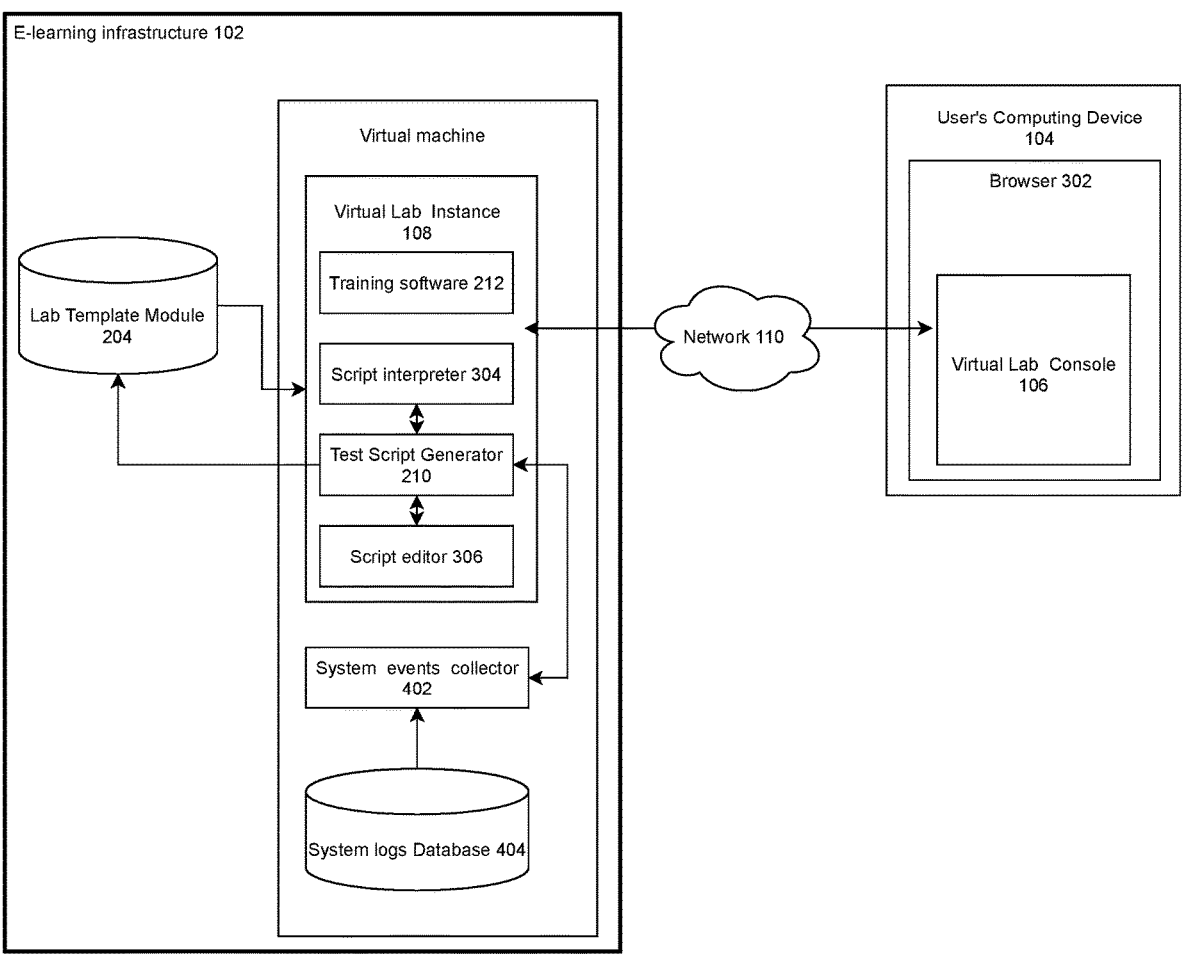
FIG. 5 is a block diagram of a virtual lab instance implemented as a virtual environment, in accordance with an embodiment.

FIG. 5 is a block diagram of the virtual lab instance 108 implemented as the virtual environment, in accordance with an embodiment. One or more virtual machines are con-nected in the virtual network 110 intercepted by the action interception tool 206. As described with reference to FIG. 2, the e-learning infrastructure 102 can be implemented through the virtual network 110, where the user computing device 104 is connected to the e-learning infrastructure 102 through a network 110. The user computing device 104 is configured with the web browser 302 on which a virtual lab console 106 is implemented. The virtual lab console 106 is connected to the virtual lab instance 108 through the network 110. In one embodiment, the virtual lab instance 108 is configured on the virtual machine in the e-learning infrastructure 102. In one embodiment, the one or more user computing devices 104 are connected to the e-learning infrastructure 102 through the virtual lab console 106. The e-learning infrastructure 102 can deploy one or more virtual machines connected to one or more virtual lab consoles 106 through the network 110. Each virtual machine is configured on a physical real computing system, such as user computing device 104.

The virtual machine includes training software 212 and a script interpreter 304, and, as described with reference to FIG. 2, can access the system logs that occurred on the user computing device 104.

Figure 6:
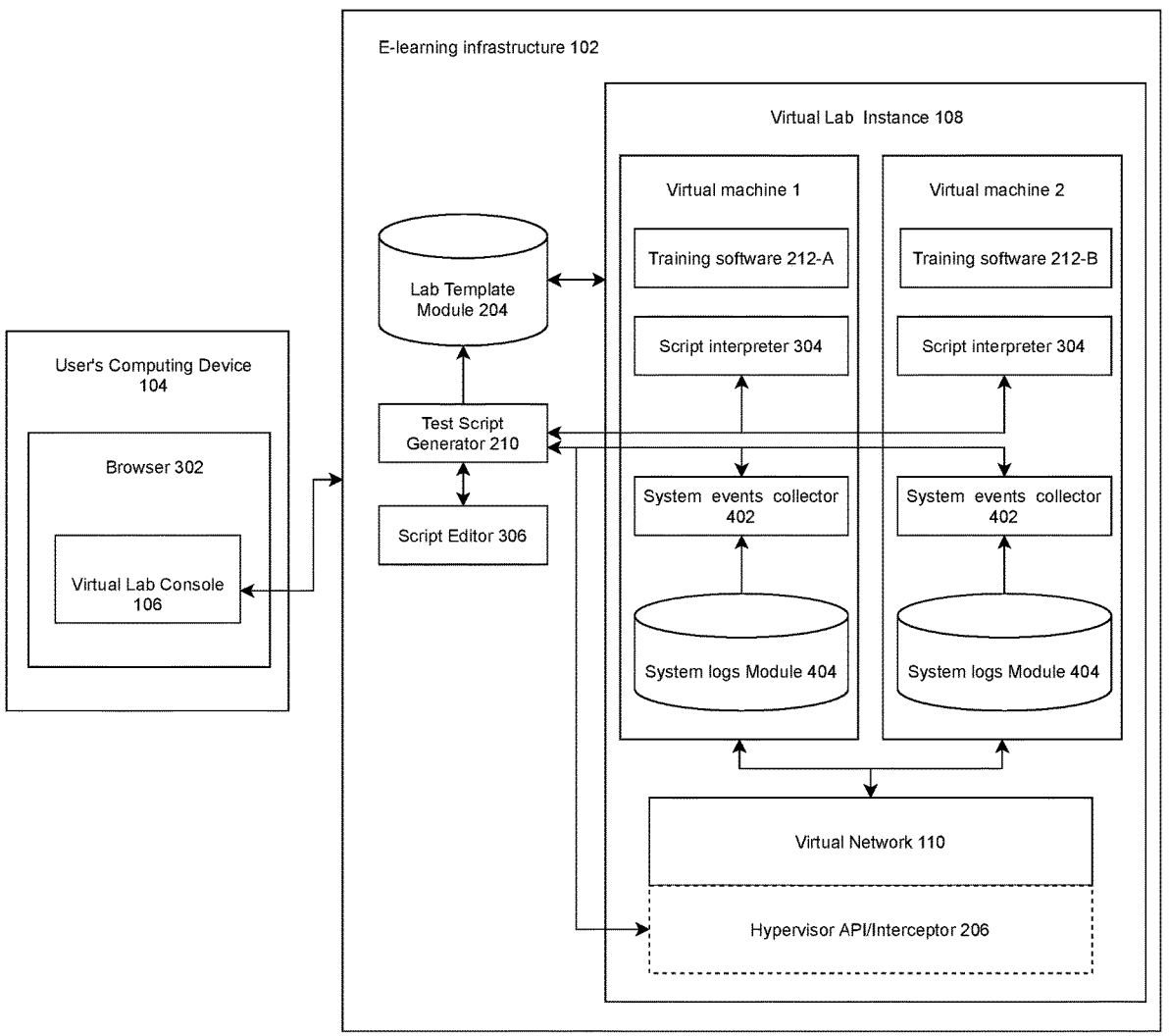
FIG. 6 is a block diagram of a system having a plurality of virtual machines configured within a virtual lab instance, in accordance with an embodiment.

FIG. 6 is a block diagram of a system having a plurality of virtual machines configured within the virtual lab instance 108, in accordance with an embodiment. As shown in the FIG. 6, the e-learning infrastructure 102 includes the virtual lab instance 108, the lab template module 204, the test script generator 210, and the script editor 306. The virtual lab instance 108 includes one or more virtual machines connected though the virtual network 110. Each virtual machine can be configured to run different training software components 212; for example, the virtual machine A is set to test the training software 212-A. Similarly, the virtual machine 2 is set to test the training software 212-B. Each virtual machine obtains the lab template corresponding to the respective training software. Each virtual machine collects the system log through the system event collector. The events are intercepted and preprocessed to generate the training script. In one embodiment, the e-learning infrastructure 102 is implemented on the user's computing device through the virtual lab console 106.

FIG. 7 is a flowchart of a method 700 for creating a training script on a virtual laboratory instance with installed training software 212 and running in an e-learning infrastructure 102, in accordance with an embodiment.

According to an embodiment, at 702, a virtual laboratory instance is deployed from a template on e-learning infrastructure 102. In one embodiment, the virtual laboratory instance comprises preconfigured training software 212 an action interception tool, such as action intercepting tool 206. The pre-configured training software 212 can include different components which can be tested on the virtual lab instance 108.

According to an embodiment, at 704, system events are intercepted using the action interception tool. In an embodiment, intercepted events correspond to training software operation. Based on the type and requirements of the training software, the one or more corresponding actions are determined that can be indicative of testing operations. In one embodiment, an action performed by an administrator user triggers the interception.

According to an embodiment, at 706, intercepted events are pre-processed by filtering and grouping events into an action-centric dataset. Not all events are valuable for testing or practical task performance purposes. Therefore, the events are filtered and grouped to determine valuable events.

According to an embodiment, at 708, a training script is generated using a machine learning model, based on an action-centric dataset, in a human-readable format.

According to an embodiment, at 710, the training script is stored in a structured text-based format file.

10

The invention claimed is:

1. A method for creating a training script on a virtual laboratory instance including installed training software and running in an e-learning infrastructure comprising:

on a user computing device having a processor and memory:

deploying a virtual laboratory instance as a snapshot of a system state from a template on the e-learning infrastructure, the system state comprising a plurality of system data required to recreate an instance of one or more virtual machines deployed on the e-learning infrastructure, and a plurality of training steps to perform certain events reflective of the system state, wherein the virtual laboratory instance comprises preconfigured training software being software tested on the virtual laboratory instance and an action interception tool, the virtual laboratory instance operating as a virtual machine on the user computing device, the virtual machine deployed from the template, the template corresponding to a specific state of the preconfigured training software;

intercepting system events using the action interception tool corresponding to training software operation;

pre-processing the intercepted system events by filtering all system events to obtain a subset of all system events as a group of valuable system events according to a set of rules into an action-centric dataset;

generating a training script using a machine learning model, based on the action-centric dataset, in a human-readable format, wherein the machine learning model is trained on labeled data including at least a portion of the action-centric dataset marked with corresponding text that represent test script steps; and storing the training script in a structured text-based format file for subsequent testing of the preconfigured training software.

2. The method of claim 1, wherein the e-learning infrastructure is operated by a user through a web browser or a virtual lab console.

3. The method of claim 1, further comprising editing the training script by a script editor.

4. The method of claim 1, wherein the template comprises at least one of a Virtual machine snapshot, a container file, and a configuration file.

5. The method of claim 1, wherein the e-learning infrastructure is deployed in a form of at least one of:

an installed application on a user computing device;

a web server connected to the user computing device through a network;

a virtual network in a virtual environment, wherein one or more virtual machines are connected in the virtual network; and a plurality of containers running on a server.

6. The method of claim 1, wherein the training script is saved as a snapshot of the virtual laboratory instance and recorded in a sequence of system event occurrences, and wherein the training script is replayable according to the sequence of system event occurrences.

7. The method of claim 1, further comprising evaluating a state of the virtual laboratory instance to ensure successful execution of the installed training software.

8. The method of claim 1, wherein the installed training software is multi-componental and implemented on a plurality of virtual laboratory instances.

9. A system to create a training script on a virtual laboratory instance including installed training software and running in an e-learning infrastructure, the system comprising:

a user computing device having a processor and memory, including:

a virtual lab instance, deployed from a lab template as a snapshot of a system state on the e-learning infrastructure, the system state comprising a plurality of system data required to recreate an instance of one or more virtual machines deployed on the e-learning infrastructure, and a plurality of training steps to perform certain events reflective of the system state, comprises a preconfigured training software being software tested on the virtual laboratory instance and an action interception tool, wherein the action interception tool is configured to intercept system events corresponding to training software operation, the virtual lab instance operating as a virtual machine on the user computing device, the virtual machine deployed from the lab template, the template corresponding to a specific state of the preconfigured training software;

a pre-processing module configured to pre-process the intercepted system events by filtering all system events to obtain a subset of all system events as a group of valuable system events according to a set of rules into an action-centric dataset;

a test script generator configured to generate a training script based on the action-centric dataset, in a human readable format, wherein the machine learning model is trained on labeled data including at least a portion of the action-centric dataset marked with corresponding text that represent test script steps; and a script storage configured to store the training script in a structured text-based format file for subsequent testing of the preconfigured training software.

10. The system of claim 9, wherein the e-learning infrastructure is operated by a user through a web browser and a virtual lab console.

11. The system of claim 9, further comprising a script editor configured to edit the training script.

12. The system of claim 9, wherein the template comprises at least one of a Virtual machine snapshot, container file, and configuration file.

13. The system of claim 9, wherein the e-learning infrastructure is deployed as at least one of:

an installed application on a user computing device;

a web server connected to the user computing device through a network;

a virtual network in a virtual environment, wherein one or more virtual machines are connected in the virtual network; and a plurality of containers running on a server.

14. The system of claim 9, wherein the training script is saved as a snapshot of the virtual laboratory instance and recorded in a sequence of system event occurrences, and wherein the training script is replayable according to the sequence of the system event occurrences.

15. The system of claim 9, wherein a state of the virtual laboratory instance is evaluated to ensure successful execution of the installed training software.

16. The system of claim 9, wherein the installed training software is multi-componential comprising at least one Database (DB) node, a management agent, and a backup engine, and implemented on a plurality of virtual laboratory instances.

17. A system for generating a training script, the system comprising:

a computing device having a processor and memory, including:

a virtual lab instance instantiated according to a lab template as a snapshot of a system state corresponding to a state of training software including a plurality of system data required to recreate an instance of one or more virtual machines deployed on the e-learning infrastructure, and a plurality of training steps to perform certain events reflective of the system state, the virtual lab instance providing a virtual simulation environment for the training software being software tested on the virtual lab instance and operating as a virtual machine on the computing device, the virtual machine deployed from the template, the template corresponding to a specific state of the training software;

an action interception tool configured to intercept system events corresponding to operation of the training software;

a pre-processing module configured to group the intercepted system events based on a dataset of valuable events to create a group of intercepted system events by not including a non-valuable event from one of all of the intercepted system events in the action-centric dataset according to a set of rules; and a test script generator configured to generate a training script based on the group of intercepted system events for subsequent testing of the training software.

18. The system of claim 17, further comprising a script interpreter executing in the virtual lab instance, the script interpreter configured to execute script steps without compilation into a machine language.

19. The system of claim 17, wherein the virtual lab instance provides a second virtual simulation environment for a second training software, wherein the second training software is different than the training software.

20. The system of claim 19, wherein the action interception tool is configured to intercept system events associated with both the training software and the second training software.

* * * * *